United States Patent
Schroeder

[11] 3,757,604
[45] Sept. 11, 1973

[54] SERVICE BRAKE LOCK MECHANISM
[75] Inventor: Kenneth Roger Schroeder, Holy Cross, Iowa
[73] Assignee: Deere & Company, Moline, Ill.
[22] Filed: Sept. 29, 1972
[21] Appl. No.: 293,671

[52] U.S. Cl. .................. 74/529, 74/478, 74/512
[51] Int. Cl. .................................... G05g 5/06
[58] Field of Search .................. 74/478, 529, 512

[56] References Cited
UNITED STATES PATENTS
2,497,293   2/1950   Cade ................................ 74/478

Primary Examiner—Milton Kaufman
Attorney—H. Vincent Harsha, William A. Murray et al.

[57] ABSTRACT

A lock mechanism is provided for selectively locking the service brakes of a tractor or the like in their fully engaged position. The lock mechanism includes a control rod which is movable between a released and an engaged position, the rod when in its engaged position conditioning a locking pawl which upon full application of the vehicle brakes will rotate to a position preventing the vehicle brake pedal from returning to its released position.

5 Claims, 4 Drawing Figures

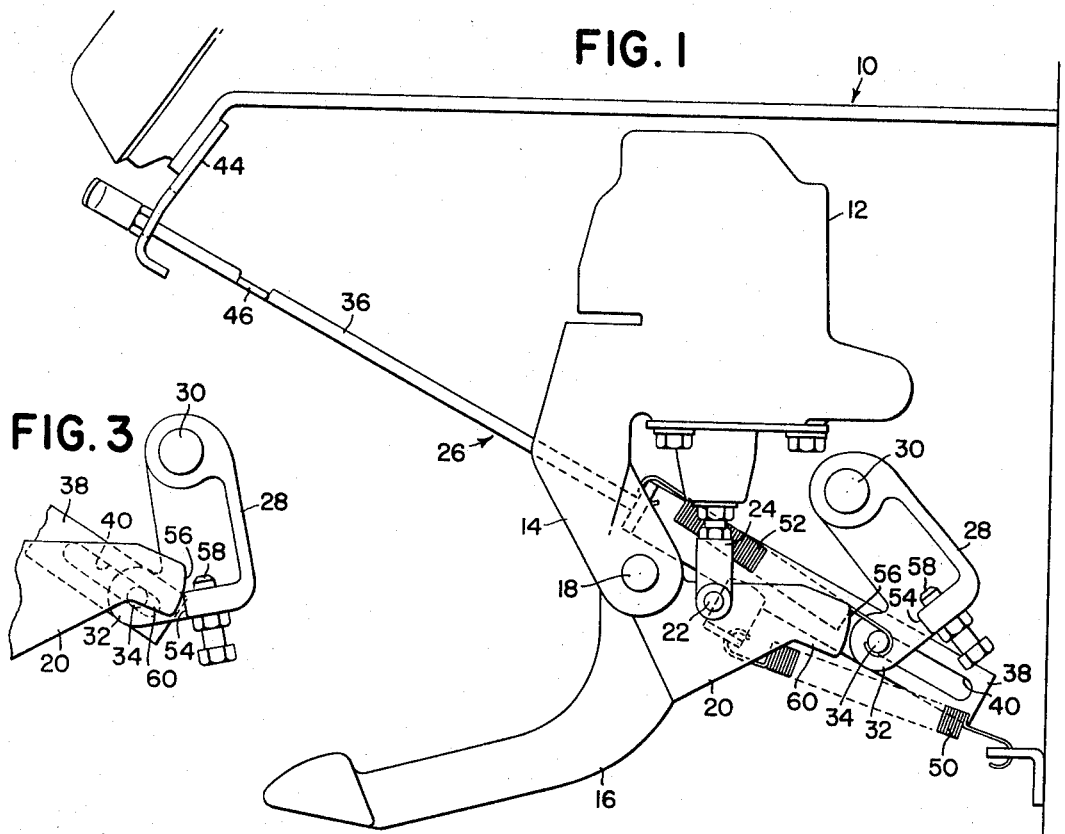
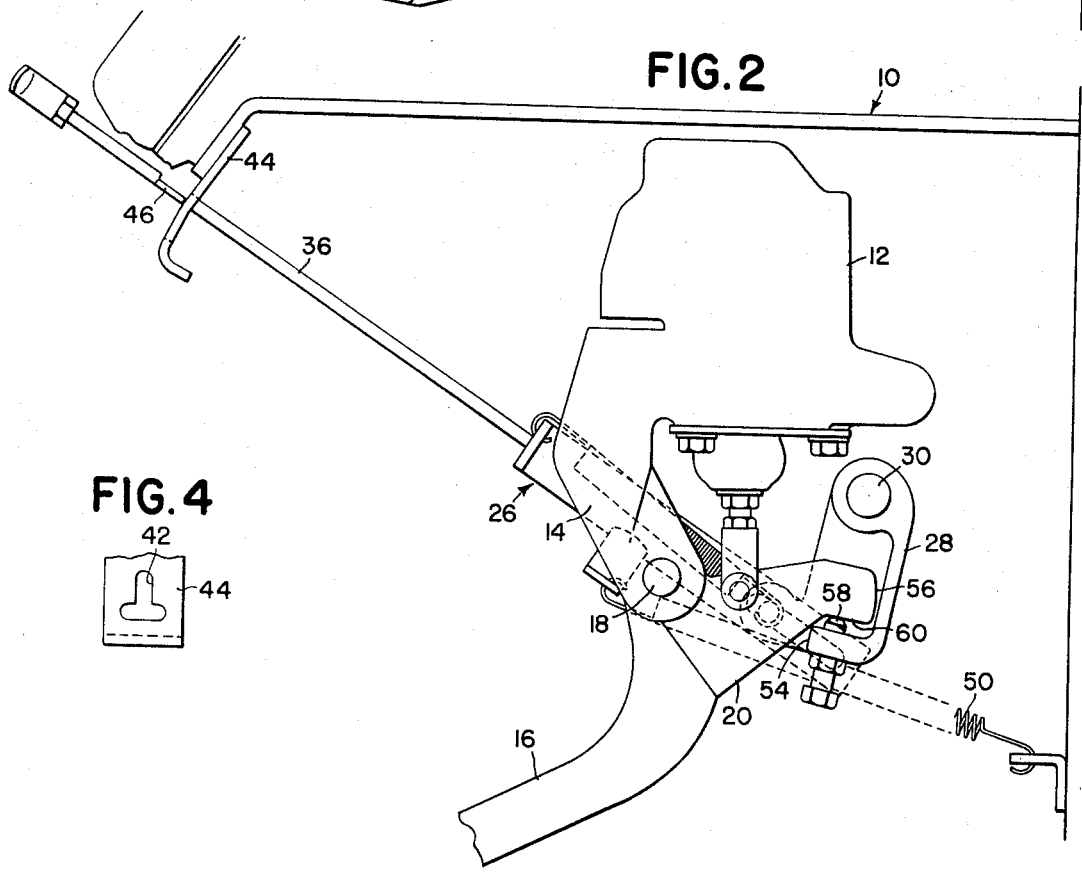

SERVICE BRAKE LOCK MECHANISM

BACKGROUND OF THE INVENTION

The present invention relates to a releasable lock mechanism for the service brakes, for example, of a vehicle such as an articulated skidder tractor.

During operation of a skidder tractor, it may become desirable to hold the tractor in a fixed position, for example, when winching a tree into position to the rear of the tractor or when the operator must leave the vehicle for the purpose of attaching the winch cable to a tree stem to be winched in.

It is known in the art to provide a tractor with releasable lock means for selectively locking the service brakes in an engaged position for preventing the tractor from being moved during certain operations. These lock means are not entirely satisfactory since many permit the service brakes of the tractor to be locked in a position other than that position required for full brake force application. The danger then exists that the brakes are not sufficiently engaged so as to prevent the vehicle from rolling. Another shortcoming of prior art lock mechanisms is that often they rely upon gravity for moving certain locking elements and also rely upon friction for holding certain locking elements in their engaged positions. These constructions are not entirely reliable since dirt and oil and other foreign matter will alter their operation.

SUMMARY OF THE INVENTION

According to the present invention, there is provided an improved service brake locking mechanism which is safe and reliable in operation. Specifically, it is an object of the invention to provide a locking mechanism which has a locking element that will not move into a locking position for blocking the brake pedal until the brake pedal has reached that position necessary for applying full braking force to the wheels. Another object is to provide such a locking mechanism having a locking element which is positively spring biased into a locking position. Still another object is to provide such a locking element which, when in its locking position, is engaged with an abutment on the service brake pedal such as to be relatively unaffected by oil and dirt and other foreign matter.

These and other objects will become apparent from the following description and the appended drawings.

BRIEF DESCRIPTION OF THE DRAWINGS

FIG. 1 is a fragmentary side view showing the service brake of a tractor together with the locking mechanism constituting the present invention.

FIG. 2 is a view similar to FIG. 1, showing the service brake pedal locked in its fully engaged position by the locking mechanism.

FIG. 3 is a fragmentary view showing an intermediate position of the locking element.

FIG. 4 is a view showing the opening through which the brake lock mechanism control rod extends.

DESCRIPTION OF THE PREFERRED EMBODIMENT

The tractor structure illustrated and about to be described may be considered typical of tractor or vehicle structures in general. A frame 10 provides support for a brake actuating valve 12 having a housing defining a depending brake pedal mounting bracket 14 to which a brake pedal 16 is rockably mounted by means of a transverse pin 18. The pedal 16 includes a forwardly extending portion 20 which is pivotally connected, as at a transverse pin 22, to the bottom ends of a pair of brake valve member plungers, only one of the plungers being shown at 24. As is customary in the art, the brake valve 12 includes biasing means (not shown) which act on the valve plungers and normally bias the latter to an extended position as shown in FIG. 1 wherein pressure fluid is blocked from the service brakes. Thus, it can be appreciated that the biasing means of the valve 12 also holds the pedal member 16 in its normal released position as shown in FIG. 1. Further, it can be appreciated that by depressing the pedal 16, the valve plungers will be forced into the valve housing until the pedal reaches its fully depressed position shown in FIG. 2, which position corresponds to that at which the valve members of the valve 12 are in a condition for causing full braking pressure to be routed to the service brakes.

Associated with the service brake pedal 16 is a locking mechanism 26 for releasably locking the pedal 16 in its fully depressed position shown in FIG. 2. The mechanism 26 comprises a locking element or pawl 28 which is mounted from the support frame 10 for fore-and-aft pivotal movement about a pin 30 which extends parallel to the axis of the brake pedal pivot pin 18. The bottom of the element 28 forms an ear 32 which extends rearwardly towards the brake pedal 16 and carries a transverse pin 34. For the purpose of pivoting the locking element 28 between its forward released position shown in FIG. 1 and its rearward locking position shown in FIG. 2, there is provided a fore-and-aft shiftable control member 36 including a forward strap portion 38 containing a fore-and-aft elongated transverse opening 40 in which is received a pin 34 carried by the locking element 28. The opening 40 and the pin 34 thus define a lost-motion connection between the control member 36 and the lock element 28. The control member 36 includes a rod-like rearward portion which is received in an inverted T-shaped opening 42 which passes fore-and-aft through a strap 44 which is in turn fixed to the frame 10. The opening 42 guides the control member 36 between its forward locking element-releasing position shown in FIG. 1 and its rearward locking element-engaging position shown in FIG. 2. The rod-like portion of the control member 36 includes an intermediate flattened portion 46 which is shaped complementary to the bottom portion of the opening 42 and is brought into abutting engagement with the rearward face of the strap 44 by raising the control member 36 upwardly once the portion 46 is pulled rearwardly through the opening 42 thus establishing a detent means for holding the control member 36 in its locking element-engaging position shown in FIG. 2.

Resisting the movement of the control member 36 to its rearward position is a first extension spring 50 which extends between the frame 10 and an ear formed on the forward strap portion 38. The spring is substantially relaxed when the control member 36 is in its forward position shown in FIG. 1 and becomes increasingly tensioned as the control member 36 is moved to the rearward position shown in FIG. 2. A second tension spring 52 extends between the rear end of the strap portion 38 of the control member 36 and the pin 34 and biases the locking element rearwardly about the pin 30 towards the latching position shown in FIG. 2. It is to be noted that the spring 52 is lighter than the spring 50 so that when the locking mechanism 26 is in the condition shown in FIG. 2, the locking element 28 is completely out of conflict with the brake pedal 16. Thus, when the control member 36 is in its forward, locking member-releasing position, the spring 52 acts merely to hold the pin 34 against the forward stop defined by the opening 40. As the member 36 is moved rearwardly, the spring 52 acts to cause the locking element 28 to rotate rearwardly until a rearwardly facing abutment surface 54 thereof comes into contact with a forwardly facing abutment surface 56 formed on the forwardly extending portion 20 of the brake pedal 16. The locking element 28 is then in its intermediate position as shown in FIG. 3 and as the control member 36 is moved on further to its furthermost position shown in FIG. 2, the spring 52 is increasingly stretched thus increasing its biasing force on the element 28 tending to move the latter to its locked position. If brake pedal 16 is then depressed so as to move the abutment surface 56 out of contact with the abutment surface 54 of the locking element 28, the spring 52 will act to rotate the locking element 28 rearwardly so as to dispose an abutment surface 58, formed by the end of a set screw extending into a flange on the locking element 28, beneath the forward extending portion 20 of the brake pedal 16 and in engagement with an abutment surface 60 formed thereon. The locking element 28 is then in its locking position shown in FIG. 2.

It is to be noted that the locking element 28 will not assume its brake-locking position unless the pedal 16 is moved to the fully engaged position, shown in FIG. 2, corresponding to that position at which maximum fluid pressure is routed by the valve 12 for applying the vehicle brakes. Further, when the element 28 is in the locking position, the friction force acting between the surfaces 58 and 60 is larger than the force exerted by the spring 50 and the operator must exert a force on the pedal 16 to relieve the friction force before the element 28 will rotate to its disengaged position. This prevents the brakes from being accidentally released by inadvertently moving the control member from its detent position.

In operation, assuming that the brake pedal 16 and the locking mechanism 26 to be in their released positions shown in FIG. 1, the operator may ready the locking mechanism for locking the pedal in its fully depressed position the next time it is depressed by moving the control member 36 rearwardly to its detent position shown in FIG. 2. As the member 36 moves rearwardly, the spring 52 will act through pin 34 to cause the locking element 28 to rotate rearwardly until the abutment surface 54 thereof engages the abutment surface 56 on the forwardly extended portion 20 of the pedal 16. If the operator then begins to depress the pedal 16 to engage the service brakes, the surface 56 will stay in contact with the locking element surface 54 until the pedal has reached that position which corresponds to that at which the valve 12 is conditioned for routing maximum fluid pressure for applying the brakes. As the surface 56 moves past the surface 54, the spring 52 will act to rotate the element 28 to its locking position wherein the abutment surface 58 thereof is in contact with the surface 60 of the brake pedal 16 so as to prevent the pedal 16 from moving towards its released position once the operator no longer exerts a force on the pedal.

If the operator then wishes to release the service brake, he may do so by first releasing the control member 36 from its detent position shown in FIG. 1. The force of the return spring 50 will then act on the member 36 to bring the rearward end of the opening 40 into engagement with the pin 34 to thus apply a releasing force on the locking element 28. This releasing force however is not large enough to overcome the force of friction holding the abutment surfaces 58 and 60 together and the operator must then apply a force to the pedal 16 to balance the pressure force exerted thereon. The spring 50 will then simultaneously return the control member 36 and the locking element 28 to their released positions shown in FIG. 1.

I claim:

1. In a vehicle having a structure supporting a brake pedal rockable forwardly about an axis from a normal brake-releasing position to a fully depressed brake-engaging position, the combination with said pedal of a locking element rockable about an axis spaced forwardly from and parallel to the brake pedal axis and being rockable between a forward normal disengaged position, wherein it is out of engagement with the brake pedal, and a rearward locking position wherein it is in a position blocking the brake pedal from moving from said fully depressed position; a control member mounted for fore-and-aft shiftable movement; lost-motion connection means connecting said control member with said locking element such that the latter is positively shifted forwardly by forward movement of the control member; a return spring means urging said control member toward a normally released forward position wherein the control member acts through said lost-motion connection means to hold said locking element in its disengaged position; a second spring means extending between said control member and locking element and exerting a predetermined increasing force tending to rock said locking element to its locking position as said control member is moved to a rearward position; detent means for holding said control member in said rearward position; and cooperating abutment surface means on said brake pedal and said locking element for preventing the locking element from moving to said locking position until the brake pedal is moved to said fully depressed position.

2. The combination set forth in claim 1 wherein said brake pedal is connected to and acts directly on a brake valve plunger and wherein said abutment surface means are located such when the brake pedal is fully depressed and the locking element is engaged that the force acting on the pedal due to the back pressure in the brake valve engages the surface means with such force that their frictional resistance to separation is greater than the force exerted on said locking element due to the first spring means acting through the control member when the latter is released from said holding means whereby a force must be applied to the brake pedal before the locking element will be rocked to its released position by the action of the first spring means.

3. In a vehicle having supporting structure, a brake control valve fixed to the structure and including a plunger; a brake pedal being supported by the structure and connected to said plunger and pivotally mounted for rocking about a transverse axis between a normal brake-releasing position and a fully depressed brake-engaging position, the combination with the pedal and valve of a locking mechanism, comprising: a locking element being pivotally supported from said structure for rocking about an axis located forwardly of and extending parallel to the pivot axis of the brake pedal, said element being rockable between a normal disengaged position, located forwardly of the brake pedal when the latter is in its brake-releasing position, and a rearward locking position located so as to block the return of the brake pedal to its brake-releasing position when the pedal is in its fully depressed position; an elongate control member located for fore-and-aft movement in an opening extending through a bracket fixed to said structure; said control member containing a transverse opening elongated in the direction of said fore-and-aft shifting movement; a pin being carried by said locking element and captively received in said transverse opening thereby forming a lost-motion connection; a first spring means extending between the support structure and said control member and biasing the latter forwardly to a released position wherein it acts through said lost-motion connection to hold said locking element in said disengaged position; a second spring means extending between the control member and the locking element for biasing the latter towards said locking position when the control member is moved rearwardly to an engaged position; and said brake pedal and locking element having cooperating abutment surface means for preventing the movement of the locking element to said locking position until the brake pedal has moved to said fully depressed position.

4. The combination of a service brake pedal locking mechanism for releasably locking the brake pedal in a fully depressed position corresponding to full braking force application, comprising: a brake valve including a housing fixed to a support structure and defining a depending bracket portion and containing a downwardly projecting valve plunger means located forwardly of said bracket portion; a brake pedal being pivotally connected both to said bracket portion and said plunger means by means defining transverse pivot axes, said pedal being rockable about the axis at the bracket portion between a normal brake-releasing position and a fully depressed brake-applying position; a locking element rockably dependingly supported from said structure by means of a pivotal connection defining an axis extending parallel to and located forwardly of said first-mentioned axes; said locking element and brake pedal respectively having first and second abutment surface portions tracing overlapping paths of movement; said locking element being rockable between a normal forward disengaged position; wherein the first abutment surface portion is clear of the path of movement of the second abutment surface portion, and a rearward locking position wherein said first abutment surface portion engages said second abutment surface portion when the brake pedal is in its fully depressed position; a fore-and-aft extending locking element control member extending crosswise to said pivot axes and defining a transverse opening elongated in the fore-and-aft direction; connection means joining said locking element and said control member via said opening and defining a lost-motion connection; first spring means biasing the control member forwardly to a normal released position whereat the control member acts via said lost-motion connection to hold said locking element in its forward position; said control member being shiftable rearwardly from its released position to a detented lock-engaging position; and a second spring means extending between said control member and said locking element for moving the latter to its locking position when the control member is in its lock-engaging position and the brake pedal is in its fully depressed position.

5. The combination as set forth in claim 4 wherein said first and second abutment surfaces when in engagement with each other are so located relative to the connection of the valve plunger to the brake pedal that the back pressure acting on the valve plunger when the brake pedal is fully depressed is sufficient to cause the force of frictional engagement existing between said abutment surfaces to be of a value which the force exerted by said first spring is unable to overcome when the control member is released from said detent position; whereby a force must be applied to the brake pedal to offset the back pressure force before the locking element will move to its disengaged position.

* * * * *